(12) United States Patent
Landsmann (10) Patent No.: US 9,322,324 B2
(45) Date of Patent: Apr. 26, 2016

(54) METHOD AND DEVICE FOR CONTROLLING AN ELECTRICAL ACTUATOR FOR A WASTEGATE VALVE ARRANGEMENT OF AN EXHAUST GAS TURBOCHARGER

(71) Applicant: GM GLOBAL TECHNOLOGY OPERATIONS LLC, Detroit, MI (US)

(72) Inventor: Gerhard Landsmann, Roedern (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 116 days.

(21) Appl. No.: 13/899,133

(22) Filed: May 21, 2013

(65) Prior Publication Data
US 2013/0312406 A1  Nov. 28, 2013

(30) Foreign Application Priority Data

May 25, 2012  (DE) .......... 10 2012 010 348

(51) Int. Cl.
| | |
|---|---|
| F02D 23/00 | (2006.01) |
| F02B 37/18 | (2006.01) |
| F02D 41/00 | (2006.01) |
| F02D 35/00 | (2006.01) |

(52) U.S. Cl.
CPC .......... *F02B 37/186* (2013.01); *F02D 41/0007* (2013.01); *F02D 35/0007* (2013.01); *Y02T 10/144* (2013.01)

(58) Field of Classification Search
None
See application file for complete search history.

(56) References Cited

U.S. PATENT DOCUMENTS

| | | | |
|---|---|---|---|
| 4,423,747 | A | 1/1984 | Heiser et al. |
| 4,483,146 | A | 11/1984 | Morikawa |
| 5,755,101 | A | 5/1998 | Free et al. |
| 6,134,888 | A | 10/2000 | Zimmer et al. |
| 8,347,625 | B2 | 1/2013 | Baeuerle |
| 2007/0119168 | A1 | 5/2007 | Turner |
| 2010/0024418 | A1 * | 2/2010 | Xiao ............................. 60/614 |
| 2011/0000209 | A1 | 1/2011 | Boening et al. |
| 2011/0023481 | A1 * | 2/2011 | Baeuerle ..................... 60/602 |

FOREIGN PATENT DOCUMENTS

| | | | |
|---|---|---|---|
| DE | 102008011613 A1 | 9/2009 | |
| DE | 102008051818 A1 * | 4/2010 | .............. F02B 37/18 |
| DE | 102008060343 A1 | 6/2010 | |
| DE | 102009054241 A1 | 5/2011 | |
| DE | 102009057161 A1 | 6/2011 | |

* cited by examiner

*Primary Examiner* — Mary A Davis
(74) *Attorney, Agent, or Firm* — Ingrassia Fisher & Lorenz PC (57) ABSTRACT

A method for controlling an electrical actuator for a wastegate valve arrangement of an exhaust gas turbocharger in an internal combustion engine is provided. A wastegate is situated in a bypass channel of the exhaust gas turbocharger. The method includes closing or opening the wastegate by the actuator for adjusting the exhaust gas flow routed past the exhaust gas turbocharger via the bypass channel. The wastegate is exposed to a predetermined closing force while it is in a closed state so as to regulate the closing force to a desired value for the closing force as a function of an actual value for the closing force. Computer-readable mediums embodying a computer program product having a program to perform the method are also provided.

12 Claims, 12 Drawing Sheets

METHOD AND DEVICE FOR CONTROLLING AN ELECTRICAL ACTUATOR FOR A WASTEGATE VALVE ARRANGEMENT OF AN EXHAUST GAS TURBOCHARGER

CROSS-REFERENCE TO RELATED APPLICATION

This disclosure claims priority to German Patent Application No. 10 2012 010 348.4, filed May 25, 2012, which is incorporated herein by reference in its entirety.

TECHNICAL FIELD

The technical field relates to a method for controlling an electrical actuator for a wastegate valve arrangement of an exhaust gas turbocharger in an internal combustion engine, as well as to a device for implementing the method.

BACKGROUND

Known in the art is the use of a so-called wastegate in exhaust gas turbochargers of internal combustion engines to regulate the charge air. The wastegate of a wastegate valve arrangement is usually a simple flap with which the quantity of exhaust gas flowing over the exhaust turbine of an exhaust gas turbocharger is regulated by means of an electrical actuator. Such actuators are connected with the wastegate by a connecting rod or push rod routed out of a housing. In such actuators, values of up to approx. 250 N may be required in the connecting rod to keep the wastegate in a closed position. These forces must be permanently provided in order to reliably keep the wastegate in the closed position, so that the wastegate remains tight despite the opposing forces of the exhaust gas.

Known from DE 10 2008 051 818 A1 is a method for controlling a wastegate situated in a bypass channel for a turbine of an exhaust gas turbocharger by means of an electrical actuator, in which an exhaust gas flow of an internal combustion engine can be routed past the turbine or completely on the turbine via the bypass channel by opening or closing the wastegate. When the internal combustion engine is under a load, the wastegate is closed and pressed against a wastegate valve seat with a predetermined first force, wherein this predetermined first force is selected in such a way that the bypass channel remains tightly sealed in terms of flow against the pressure exerted by the exhaust gas of the internal combustion engine during exposure to the load and at least until a desired torque is reached. In addition, this known method provides that, with the internal combustion engine under a partial load, the wastegate is closed and pressed against the wastegate valve seat with a predetermined second force, wherein the predetermined second force is less than the predetermined first force. The predetermined first force is generated by supplying a maximum holding current to the electrical actuator. Reducing this holding current that determines the first force to a second lower value helps protect the servomotor of the electrical actuator against overheating.

In this known method, preset current strength values for the electric motor of the electrical actuator are used to generate a specific respective closing force on the wastegate, wherein the higher value is generated when the internal combustion engine is under a load or exhibits a transient operating behavior, and the lower value is generated under a partial load. However, the disadvantage is that the higher value must be selected in such a way that the wastegate tightly seals the bypass channel under all arising operating conditions, in particular given a transient operation of the internal combustion engine, i.e., in an acceleration process or given rapidly switching loads, during which arising pressure pulsations of the exhaust gas make it possible to briefly press open the wastegate. As a result, even under operating conditions where the force required to tightly close the wastegate could be met with lower current values, the servomotor is unnecessarily exposed to what is then an excessive maximum or potentially also distinctly too high a level of force.

Since forces far in excess of 250 N are reached in the push rods of actuators for wastegates, there is a danger that, given the constant generation of a closing force as proposed by the method according to DE 10 2008 051 818 A1, such forces will cause damage to the exhaust gas turbocharger or its housing and lead to increased wear, since, for example given a wastegate that can be activated via a push rod, the actuating forces generated in this push rod result in reactive forces in the housing.

DE 10 2009 028 117 A1 further describes a method for operating an electrical actuator for a wastegate actuating device of an exhaust gas turbocharger, in which a wastegate can be electrically adjusted with the help of the actuator and is situated in an exhaust gas system of an internal combustion engine, wherein a quantity of exhaust gas flowing through the exhaust gas turbocharger can be set as a function of an open position of the wastegate. In this method, the actuator is exposed to an electrical current with the wastegate in a closed position, so as to generate a varying closing force corresponding to the progression of an exhaust gas back pressure applied over the wastegate. The actuator can here be activated in such a way that the closing force is essentially proportional over time to the exhaust gas back pressure or chronologically offset in its proportionality relative thereto. Since the chronological progression of the exhaust gas back pressure depends on the crankshaft position of a crankshaft in the internal combustion engine, current is supplied to the actuator as a function of the crankshaft position in order to maintain the closed position of the wastegate.

Even though this method makes it possible to reduce the power loss of the actuator by comparison to the method according to the initially mentioned DE 10 2008 051 818 A1, there is still the disadvantage that pressure pulsations of the exhaust gas might arise with the wastegate in the closed position, which could cause the wastegate to be pressed open slightly for a brief time.

Against this backdrop, at least one object herein is to provide a method for controlling an electrical actuator for a wastegate valve arrangement of an exhaust gas turbocharger in an internal combustion engine, in which the wastegate is exposed to closing forces that are optimally adjusted to the exhaust gas pressures that arise under all operating conditions. It is a further object herein to provide a device for implementing the method. In addition, other objects, desirable features and characteristics will become apparent from the subsequent summary and detailed description, and the appended claims, taken in conjunction with the accompanying drawings and this background.

SUMMARY

In accordance with an exemplary embodiment, a method for controlling an electrical actuator for a wastegate valve arrangement of an exhaust gas turbocharger in an internal combustion engine is provided. The method, in which a wastegate situated in a bypass channel of the exhaust gas turbocharger is closed or opened by the actuator for adjusting the exhaust gas flow routed past the exhaust gas turbocharger via the bypass channel, involves exposing the wastegate to a predetermined closing force while it is in a closed state, so as to regulate the closing force to a desired value for the closing force as a function of an actual value for the closing force.

A computer program according to an embodiment and a computer program product according to an embodiment have instructions for implementing the method contemplated herein.

A computer-readable storage medium according to an embodiment has a computer program according to an embodiment or a computer program product according to an embodiment.

In an embodiment and as contemplated herein, the force applied is always somewhat greater than the maximum exhaust gas force. The generated closing force is regulated to a desired value for the closing force as a function of an actual value for the closing force. With the wastegate in a closed state, the necessary tightness is obtained under all operating conditions of the internal combustion engine, even if signs of wear arise over the operating time. Because tightness is ensured over the entire operating range, the torque behavior of the internal combustion engine is improved in the lower speed range. The continuously controlled closing force on the wastegate further prevents damage to the exhaust gas turbocharger and wastegate to the greatest possible extent.

In a further embodiment that represents a cost-effective solution for providing an actual value for the closing force, the actual value for the closing force is estimated by means of a calculation model from the operating current and temperature of the actuator. Therefore, a force sensor is not required. It is advantageously provided that the calculation model also incorporates the position of the wastegate, so that the two states "open wastegate" and "closed wastegate" can each be realized with the correct closing force.

In addition, an embodiment involves determining a control deviation from the desired value for the closing force and determined actual value for the closing force, and relaying it to a controller, for example a PID controller, for generating the control signals for regulating the actuator. Using a PID controller to regulate the closing force of the wastegate has proven to be especially advantageous and expedient, since this controller type is very fast, and hence accommodates the high dynamics inherent in the behavior of the exhaust gas pressure.

In accordance with another exemplary embodiment, a method for controlling an electrical actuator for a wastegate valve arrangement of an exhaust gas turbocharger in an internal combustion engine, in which a wastegate situated in a bypass channel of the exhaust gas turbocharger is closed or opened by the actuator for adjusting the exhaust gas flow routed past the exhaust gas turbocharger via the bypass channel, involves exposing the wastegate to a predetermined closing force while it is in a closed state, so as to regulate an operating parameter of the actuator that determines the closing force to a desired value as a function of an actual value for this operating parameter.

Therefore, this embodiment is characterized by the fact that an operating parameter of the actuator, preferably its operating current, is used as the control variable instead of the closing force. As a result, this type of closing force regulation can be easily and cost-effectively realized by means of such an operating parameter of the actuator.

One embodiment here provides that a desired value for the operating current be determined based on a calculation model from a desired value for the closing force as a function of the position of the wastegate determined by means of a position sensor and the operating temperature of the actuator, and that a control deviation be ascertained through comparison with an actual value for the operating current and relayed to a PID controller for generating the control signals for regulating the actuator. Using a PID controller for regulating the closing force of the wastegate is advantageous here as well, since this type of controller is very fast, and thus accommodates the high dynamics inherent in the behavior of the exhaust gas pressure.

In a further embodiment, the operating temperature of the actuator can alternatively be estimated using a calculation model from the engine voltage supplied to the actuator as the voltage signal or control signal and its operating current. An averaged value for the engine voltage and/or an averaged value for the operating current is here preferably used. Realized as a result is a cost-effective solution by comparison to the use of a temperature sensor.

It can further be advantageous for the desired value for the closing force to be determined as a function of operating parameters for the internal combustion engine. As a result, any change in the operating state of the internal combustion engine is directly included in ascertaining the desired value for the closing force or the operating parameters of the actuator that determine the closing force, thereby yielding a high regulation accuracy.

Finally, an embodiment affords protection against overheating to the actuator, in which the desired value for the closing force or desired value for the operating parameter of the actuator that determines the closing force is reduced to a lower value at a temperature of the actuator exceeding an excessive temperature threshold.

In an exemplary embodiment, a device for controlling an electrical actuator for a wastegate valve arrangement of an exhaust gas turbocharger in an internal combustion engine with a wastegate that is situated in a bypass channel of the exhaust gas turbocharger and is closed or opened by the actuator for adjusting the exhaust gas flow routed past the exhaust gas turbocharger via the bypass channel is provided. The device is characterized by the fact that it exposes the wastegate to a predetermined closing force while it is in a closed state, so as to regulate the closing force or an operating parameter of the actuator that determines the closing force by means of a closing force controller to a desired value for the closing force as a function of an actual value for the closing force, or to a desired value for this operating parameter as a function of an actual value.

Such a device can be easily integrated into an existing electronic engine controller of the internal combustion engine of a motor vehicle.

A force sensor can be provided in a constructively easy manner for determining the actual value for the closing force.

As an alternative to using a force sensor, a further embodiment provides that a closing force estimating unit be provided to calculate the actual value for the closing force from the operating current and temperature of the actuator, as well as the position of the wastegate ascertained by a position sensor. This device can be cost-effectively realized by using the software-based solution.

Another embodiment that reduces the cost of manufacturing the device provides that the desired value for the operating parameter of the actuator that determines the closing force be calculated by a desired current calculating unit, which is designed to calculate a desired value for the operating current from a desired value for the closing force, the temperature of the actuator, and the position of the wastegate ascertained by a position sensor.

To this end, a temperature sensor can preferably be used to determine the temperature of the actuator, or a temperature estimating unit can be cost-effectively employed to calculate the temperature from the correlation between the operating current and operating voltage of the actuator and the engine voltage supplied to the actuator.

Further embodiments of the invention are also possible.

In an embodiment, the actual value for the closing force is determined by a force sensor, providing a solution that is structurally easy to realize. Such a force sensor can be arranged as a strain gauge on the push rod of the actuator that establishes the connection to the wastegate.

Another embodiment provides that the operating temperature of the actuator be determined by a temperature sensor, providing a simple solution from a structural standpoint.

An embodiment provides a device for controlling an electrical actuator for a wastegate valve arrangement of an exhaust gas turbocharger in an internal combustion engine, with means for opening or closing a wastegate situated in a bypass channel of the exhaust gas turbocharger by way of the actuator for adjusting the exhaust gas flow routed past the exhaust gas turbocharger via the bypass channel. The wastegate is exposed to a predetermined closing force while it is in a closed state, so as to regulate the closing force to a desired value for the closing force as a function of an actual value for the closing force.

In an embodiment, the device exhibits:

Means for estimating the actual value for the closing force from the operating current and operating temperature of the actuator, and preferably also from the position of the wastegate determined by a position sensor, based on a calculation model.

In an embodiment, the device exhibits:

Means for determining a control deviation from the desired value for the closing force and the determined actual value for the closing force, and for relaying the determined control deviation to a controller for generating the control signals for regulating the actuator.

An embodiment provides a device for controlling an electrical actuator for a wastegate valve arrangement of an exhaust gas turbocharger in an internal combustion engine, with means for opening or closing a wastegate situated in a bypass channel of the exhaust gas turbocharger by means of the actuator for adjusting the exhaust gas flow routed past the exhaust gas turbocharger via the bypass channel. The wastegate is exposed to a predetermined closing force while it is in a closed state, so as to regulate an operating parameter of the actuator that determines the closing force to a desired value as a function of an actual value for this operating parameter.

In an embodiment, the device exhibits:

Means for using the operating current of the actuator as an operating parameter that determines the closing force, wherein a desired value for the operating current is determined based on a calculation model from a desired value for the closing force as a function of the position of the wastegate determined by means of a position sensor and the operating temperature of the actuator, and a control deviation is ascertained through comparison with an actual value for the operating current, and relayed to a controller for generating the control signals for regulating the actuator.

In an embodiment, the device exhibits:

Means for calculating the temperature of the actuator from the engine voltage supplied to the actuator, and estimating its operating current based on a calculation model.

In an embodiment, the device exhibits:

Means for determining the desired value for the closing force as a function of operating parameters for the internal combustion engine.

In an embodiment, the device exhibits:

Means for reducing the desired value for the closing force or the desired value for the operating parameter of the actuator that determines the closing force to a lower value at a temperature of the actuator that exceeds an excessive temperature threshold.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the various embodiments or the application and uses thereof. Furthermore, there is no intention to be bound by any theory presented in the preceding background or the following detailed description.

Figure 1:
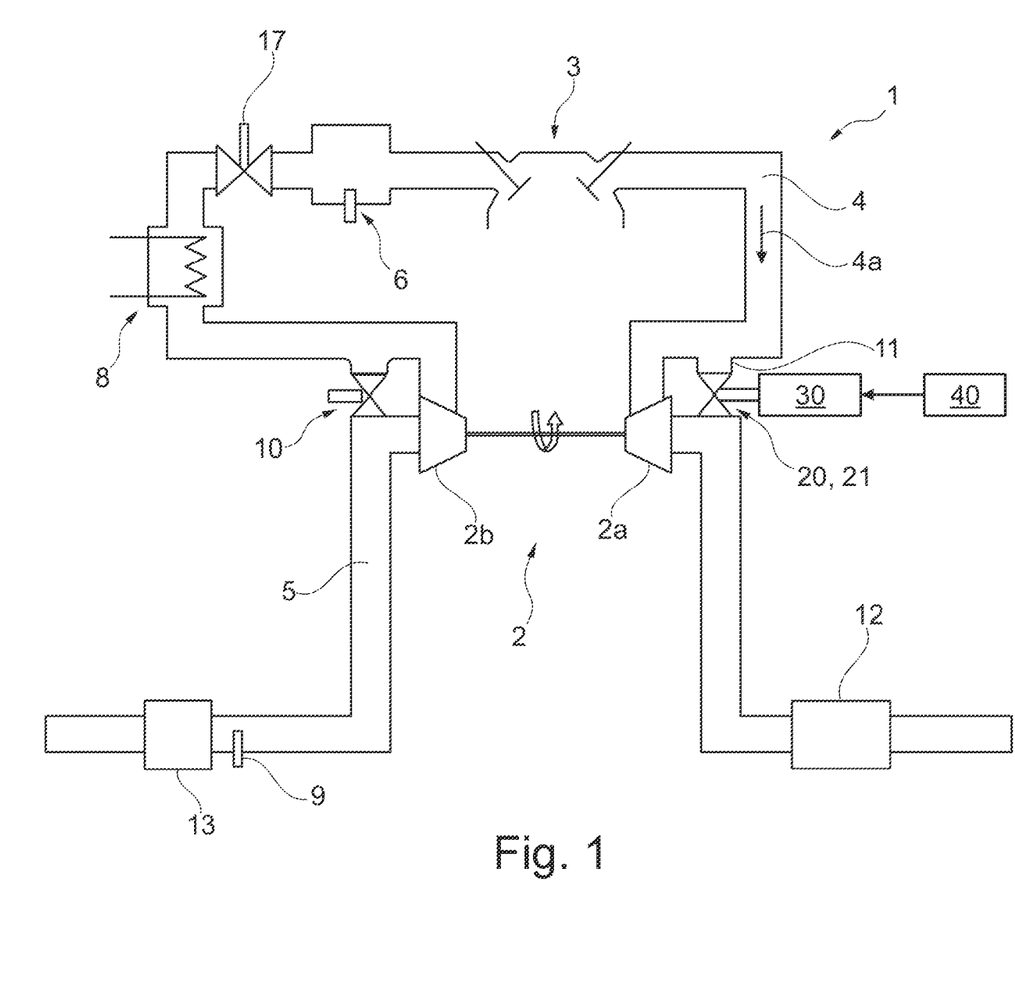
FIG. 1 is a schematic view of an internal combustion engine with an exhaust gas turbocharger according to an exemplary embodiment.

The internal combustion engine 1 according to FIG. 1 alludes to a cylinder with a combustion chamber 3 and an inlet and outlet valve. The exhaust gas flow 4a from the combustion chamber 3 is relayed by means of an exhaust gas line 4 over a turbine 2a of an exhaust gas turbocharger 2, which is connected with a compressor wheel 2b, to which fresh air filtered through a fresh air filter 13 is routed via a fresh air channel 5 for compression purposes. The compressed air is relayed to the combustion chamber 3 from an outlet of the compressor 2b by way of an intercooler 8 and throttle valve 17 to the combustion chamber. Also situated on the compressor side of the exhaust gas turbocharger 2 is a recirculating air valve 10, which prevents compressed air from being repelled back into the compressor housing of the exhaust gas turbocharger 2 when closing the throttle valve 17, and there decelerating the compressor wheel 2b, which could cause damage to the exhaust gas turbocharger 2.

Also situated between the throttle valve 17 and inlet valve of the combustion chamber 3 is a manifold pressure sensor 6, whose measuring signals are relayed to an engine controller. The measuring signals of an air-flow sensor 9 are likewise routed to this engine controller.

On the turbine side of the exhaust gas supercharger 2, the exhaust gas line 4 exhibits a bypass channel 11, which can be opened and closed by means of a bypass valve arrangement 20 that exhibits a wastegate 21, so that a portion of the exhaust gas flow 4a can be routed past the turbine 2a with the wastegate 21 in an open state, so as to recombine with the exhaust gas flow relayed through the turbine 2a before the entire exhaust gas flow 4a is passed through a catalytic converter 12.

The bypass valve arrangement 20 is activated by an actuator 30, which in turn is controlled by a control unit 40.

The method for controlling the bypass valve arrangement 20 will be explained below based on FIGS. 2 to 13, which among other things depict various exemplary embodiments of the control unit 40, wherein this control unit 40 can optionally be integrated into an engine controller of the internal combustion engine 1 or alternatively into the actuator itself.

Figure 2:
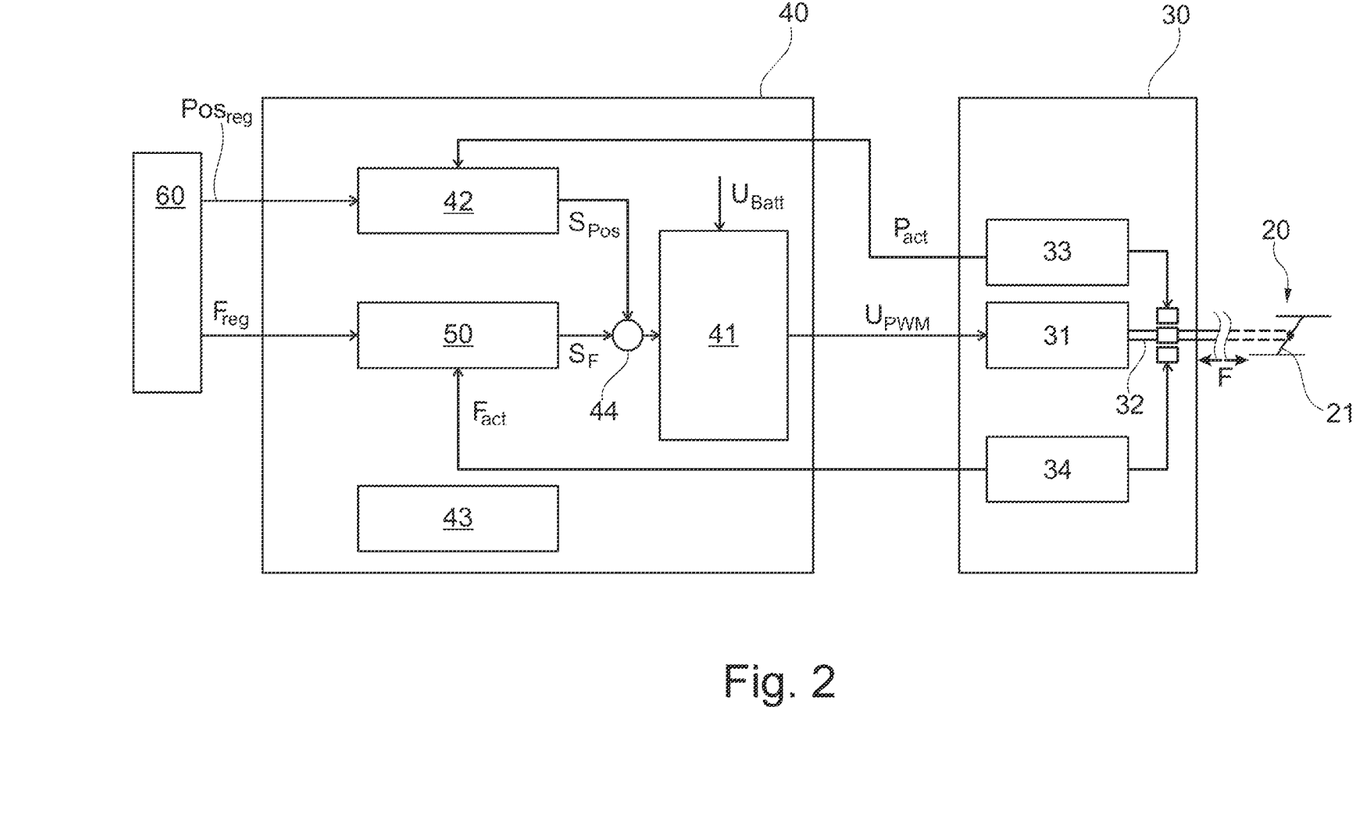
FIG. 2 is a block diagram of an actuator with a trigger circuit, according to an exemplary embodiment.

According to FIG. 2, the actuator 30 encompasses an electric motor 31, which as a linear drive activates the wastegate 21 of the bypass valve arrangement 21 by way of a push rod 32, i.e., moves it out of a closed state that seals the bypass channel 11 into an open state that releases the bypass channel 11 and vice versa. This actuator 30 further has a position sensor 33 that acquires the position of the wastegate 21 as well as a force sensor 34, which measures the closing force that is generated by the torque of the electric motor 31 and acts on the wastegate 21, for example by means of a strain gauge.

The electric motor 31 of the actuator 30 is controlled by a driver circuit 41 of the control unit 40 according to FIG. 2 via a PWM signal $U_{PWM}$, which represents the engine voltage of the electric motor 31. To this end, the driver circuit 41 is put together with semiconductor switches in an H bridge circuit. The measuring signal of the position sensor 33 that indicates the open or closed position of the wastegate 21 is relayed to a position regulator 42. The measuring signal of the force sensor 34 that indicates the current closing force $F_{act}$ uses a closing force controller 50 of the control unit 40. Finally, the control unit 40 also exhibits a diagnostic unit 43.

The driver circuit 41 is supplied with battery voltage $U_{Batt}$ from an onboard power supply.

The closing force controller 50 is part of a control circuit for regulating the closing force F of the wastegate 21 as the control variable. This control circuit encompasses this closing force controller 50 as a controller, the driver circuit 41 in conjunction with the electric motor 31 as the actuator, and the bypass valve arrangement 20 with the wastegate 21 as the control path, as well as the force sensor 34 as a feedback loop of the current closing force $F_{act}$ as the actual value for the closing force to the closing force controller 50.

As the desired value for the closing force relative to the closing force F on the wastegate 21, an engine controller 60 generates a desired value for the closing force $F_{reg}$ and relays it to the closing force controller 50. This desired value for the closing force $F_{reg}$ is determined as a function of the measured value of the air-flow sensor 1 (see FIG. 1) and, if necessary, as a function of the speed of the internal combustion engine 1 based on a characteristic map stored in the controller 60. The closing force controller 50 uses this desired value for the closing force $F_{reg}$ and the actual value for the closing force $F_{act}$ to form a control deviation, and generate a control signal $S_F$ from the latter that is rounded with a control signal $S_{Pos}$ (summating unit 44) and relayed to the driver circuit 41, which generates a voltage signal from this, i.e., the PWM signal $U_{PWM}$ as a control variable for the electric motor 31, so that the corresponding torque produces a specific closing force F on the wastegate 21.

By regulating the closing force F of the wastegate 21 to a prescribed desired value for the closing force $F_{reg}$ in this way, the closing force F is continuously controlled and, if needed, readjusted, not just given a change in the operating conditions, but in particular given a change in the pressure conditions on the wastegate 21 brought about by the exhaust gas flow 4a.

Figure 3:
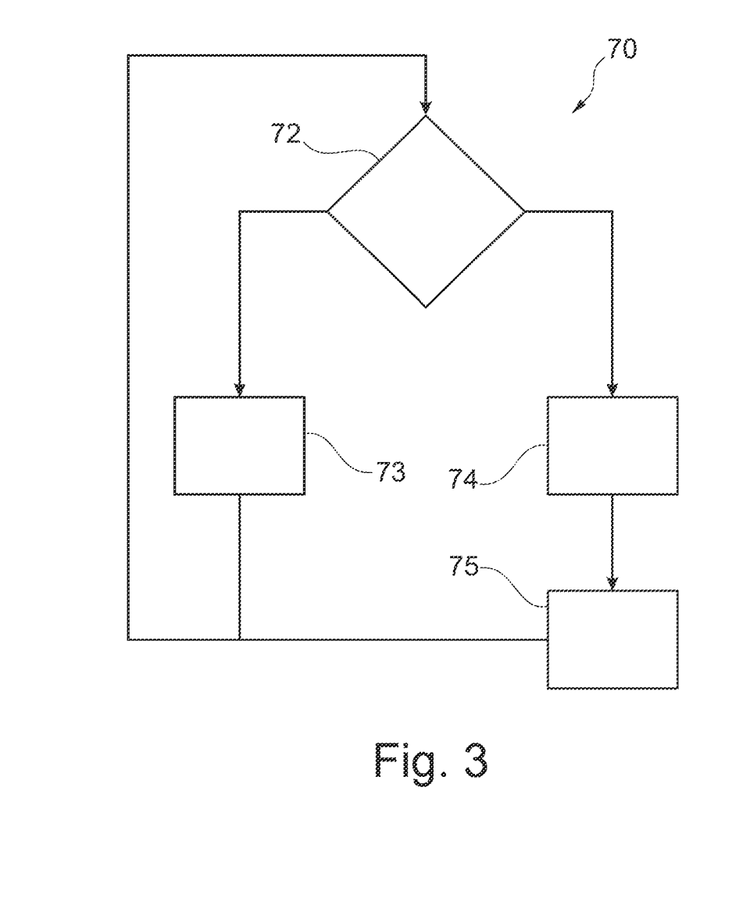
FIG. 3 is a flowchart of the computer program for controlling an electrical actuator for a wastegate valve arrangement of an exhaust gas turbocharger according to an exemplary embodiment.

FIG. 3 shows an exemplary embodiment of a computer program 70. The computer program begins at a decision block 72, where a decision is made as to whether to open or close the wastegate. If the wastegate is to be opened, command 73 prompts the program to open the wastegate. If the wastegate is to be closed, command 74 prompts the program to close the wastegate. Command 75 then causes the wastegate to be exposed to a predetermined closing force. After the wastegate has been opened or closed, the program returns to decision block 72.

Figure 4:
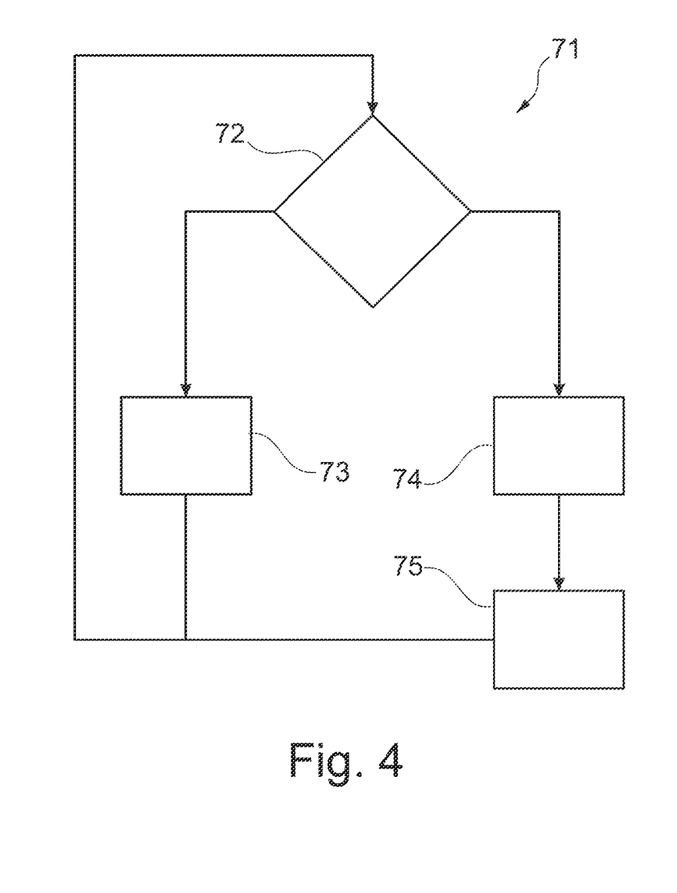
FIG. 4 is a flowchart of the computer program product corresponding to the computer program of FIG. 3.

FIG. 4 shows an exemplary embodiment of a computer program product 71. The computer program product 71 on FIG. 4 corresponds to the computer program on FIG. 3.

Figure 5:
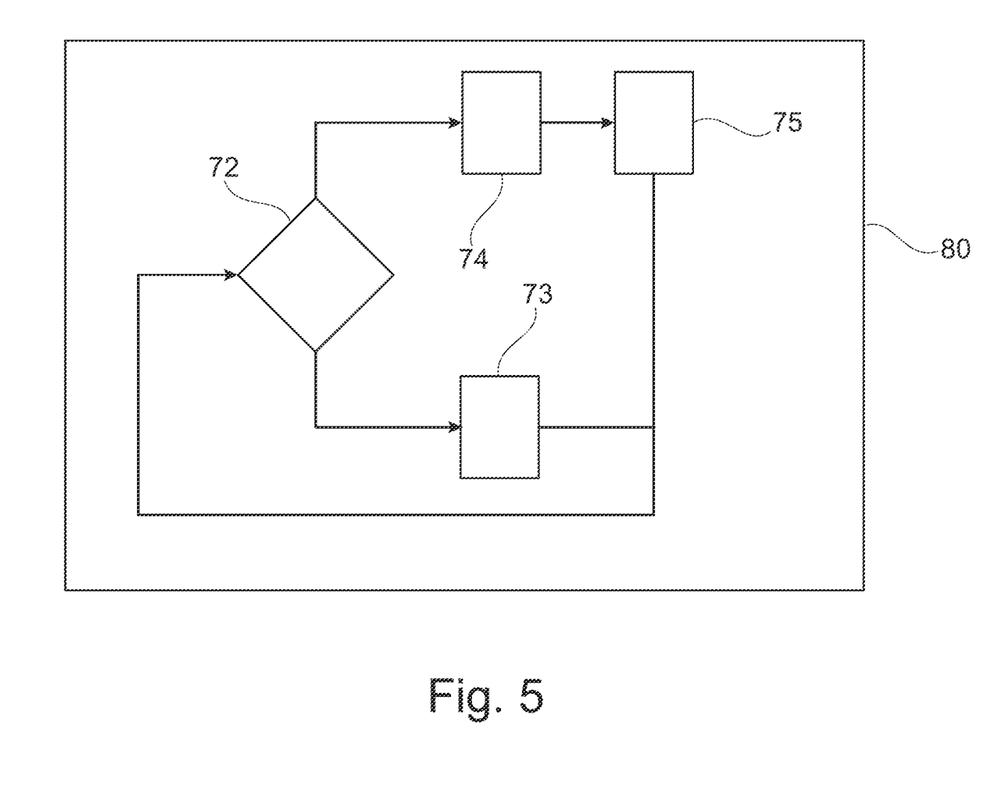
FIG. 5 is a block diagram of the computer-readable storage medium according to an exemplary embodiment.

FIG. 5 shows an exemplary embodiment of a computer-readable storage medium 80. The computer-readable storage medium 80 on FIG. 5 exhibits a computer program 70 according to FIG. 3.

Figure 6:
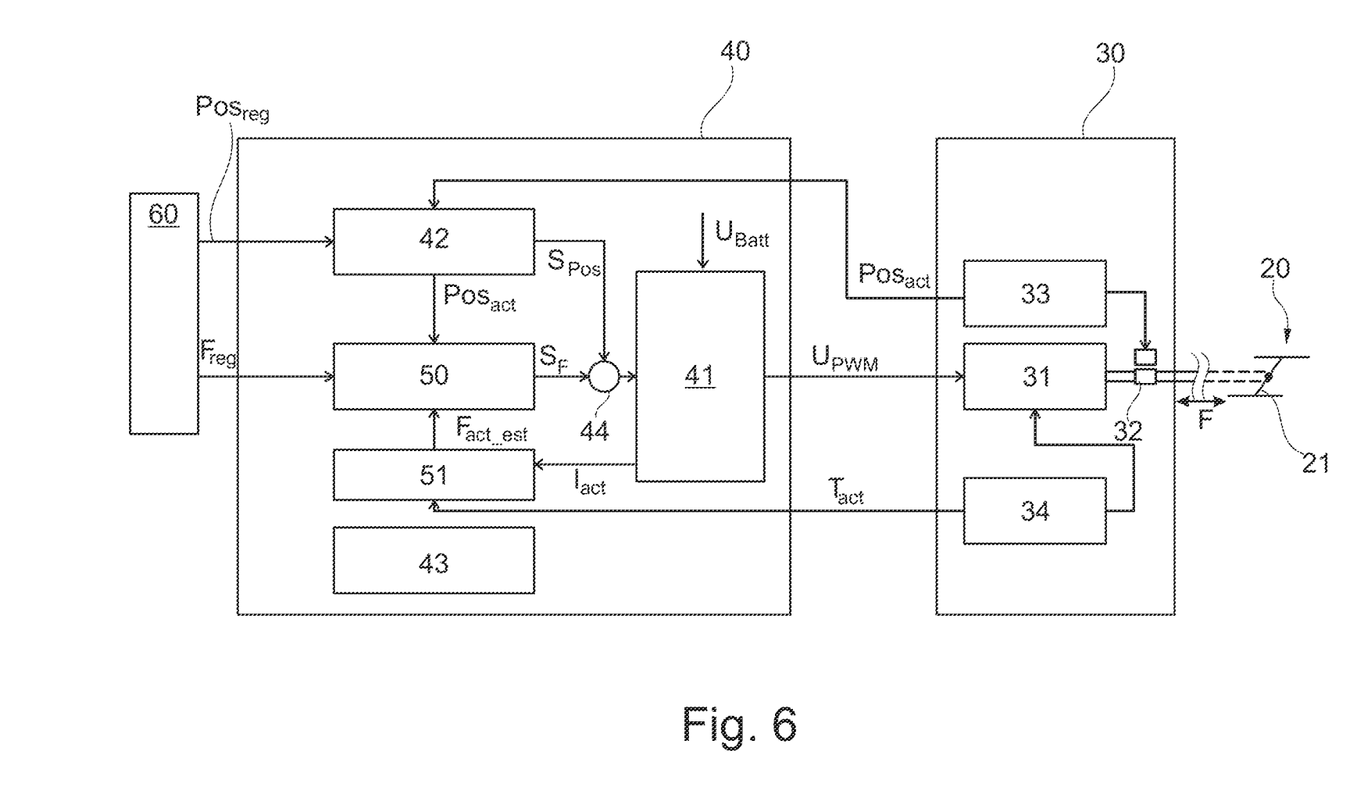
FIG. 6 is a block diagram of an actuator with trigger circuit according to an exemplary embodiment.

FIG. 6 shows another exemplary embodiment, which differs from the one on FIG. 2 in that the actuator 30 exhibits a temperature sensor 35 that determines the operating temperature $T_{act}$ instead of a force sensor, and the control unit 40 additionally has a closing force estimating unit 51. This closing force estimating unit 51 is used to estimate the current closing force $F_{act\_est}$ as an actual value based on the operating current $I_{act}$ and operating temperature $T_{act}$ of the actuator 30, i.e., the electric motor 31, as the operating parameters.

While a control circuit is used to regulate the closing force F on the wastegate 21 to a desired value in the exemplary embodiment according to FIG. 6 as well, the difference relative to the exemplary embodiment according to FIG. 2 is that the control variable is fed back to the closing force controller 50 via the temperature sensor 35 and closing force estimating unit 51.

Figure 7:
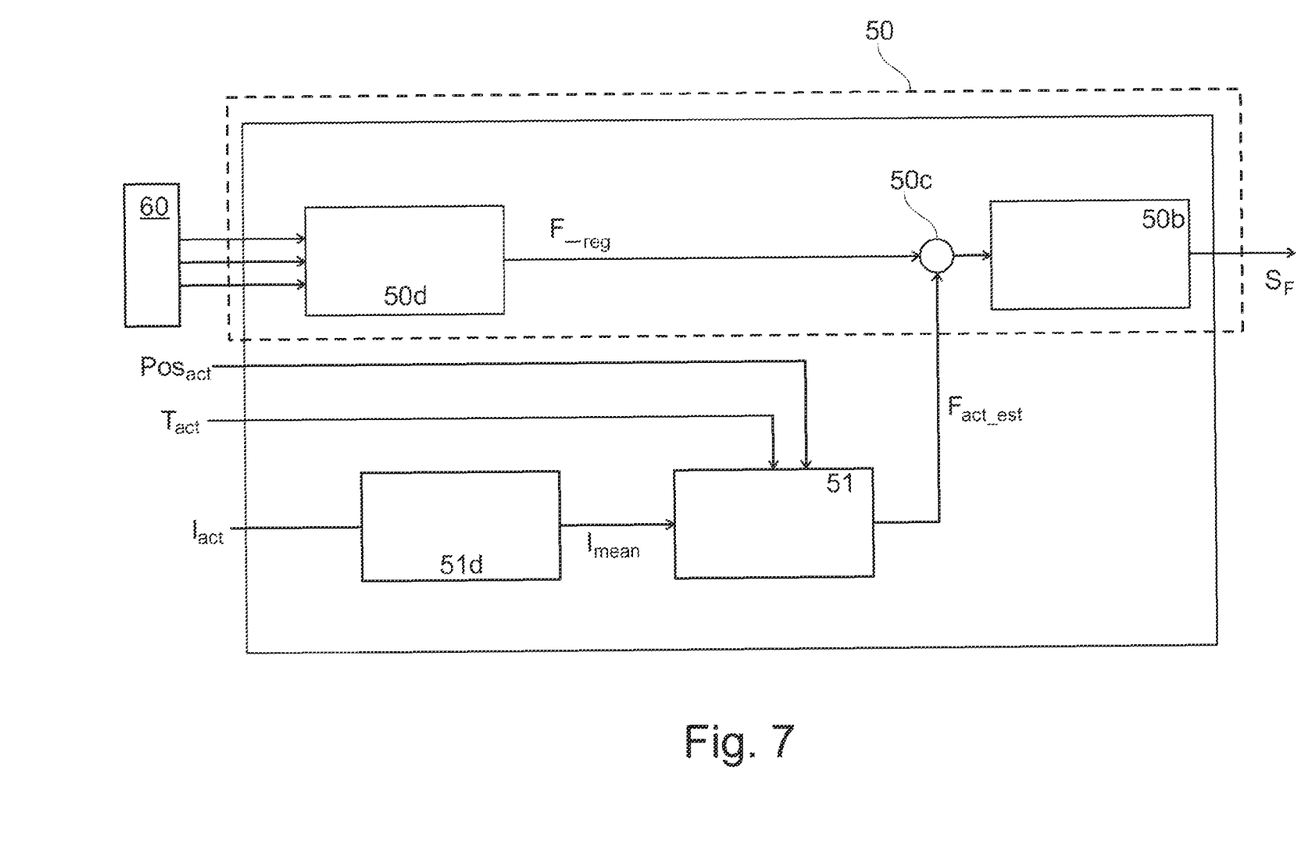
FIG. 7 is a block diagram of the closing force controller according to FIG. 6.

The function of the closing force controller 50 and closing force estimating unit 51 will be explained based on FIG. 7.

The engine controller 60 is used to route operating parameters of the internal combustion engine 1 to a closing force calculating unit 50a, which determines a desired value for the closing force $F_{reg}$ based on these operating parameters. This closing force calculating unit 50a can also be a component of the engine controller 60.

The closing force estimating unit 51 is used to estimate an actual value for the closing force $F_{act\_est}$ based on a mathematical model. The formula below is used for this purpose:

$$F_{act\text{-}est} = (B(T_{act}) \cdot I_{mean})/K(\text{Pos}_{act}),$$

wherein $I_{mean}$ is the mean of the operating current I generated by the PWM signal as a voltage signal, $B(T_{act})$ is a coupling factor as a function of the current operating temperature $T_{act}$ and $K(\text{Pos}_{act})$ is a coupling factor as a function of the current position $\text{Pos}_{act}$ of the wastegate 21.

The mean $I_{mean}$ of the operating current I is calculated by a current calculating unit 51a, wherein this current calculating unit 51a can also be part of the engine controller 60.

The desired value for the closing force $F_{reg}$ and the actual value for the closing force $F_{act\_est}$ are routed to a summating unit 50c to form a control deviation, so as to then have a PID controller 50b generate a control signal $S_F$, which according to FIG. 6 is relayed via the summating unit 44 to the driver circuit 41, which uses it to form the PWM voltage signal $U_{PWM}$ as a control variable for the electric motor 31.

Figure 8:
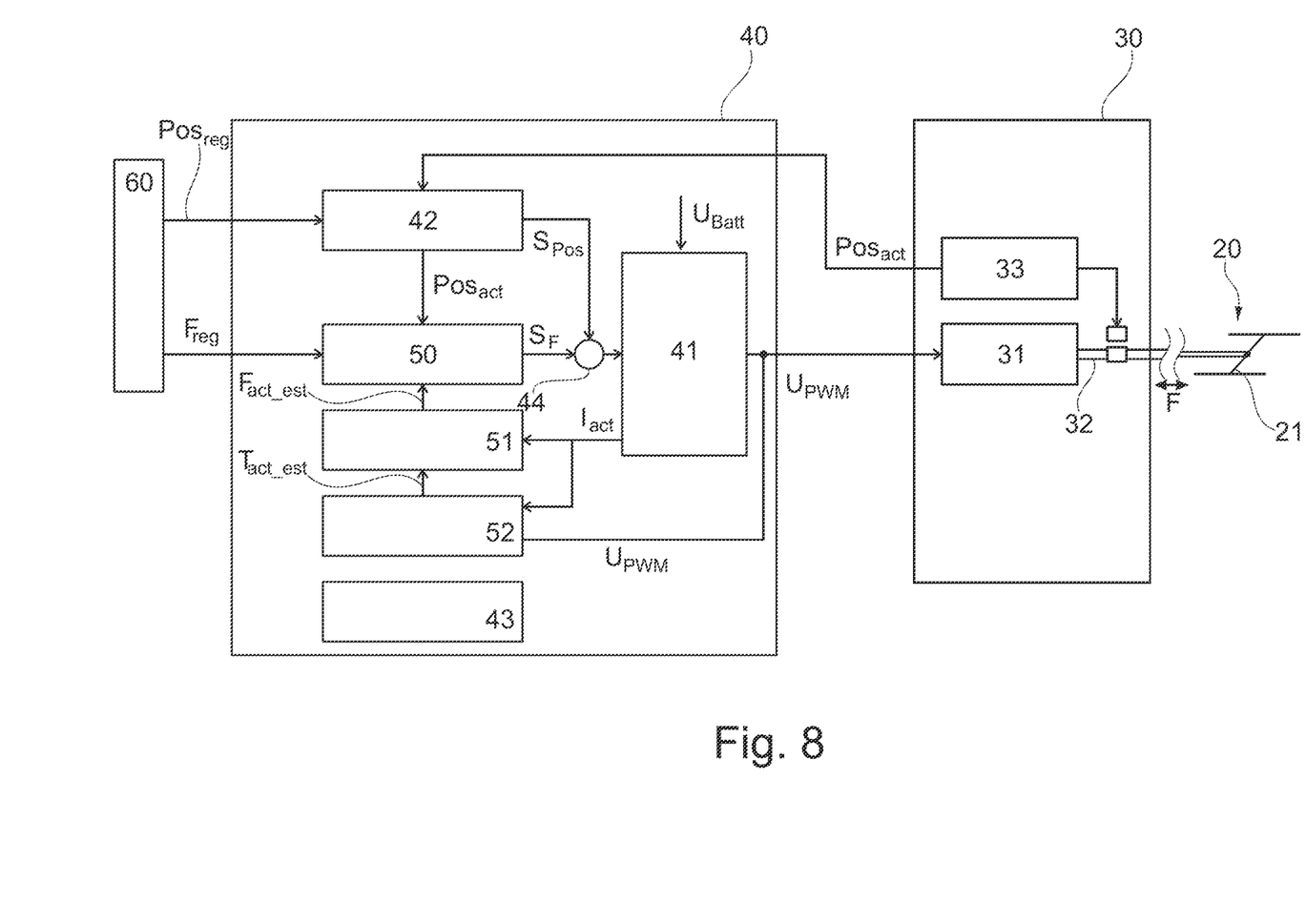
FIG. 8 is a block diagram of an actuator with trigger circuit according to an exemplary embodiment.

By comparison to the exemplary embodiment according to FIG. 6, the one according to FIG. 8 also does without a temperature sensor 35 for estimating the current closing force as an actual value for the closing force $F_{act\_est}$ to regulate the closing force F, and instead also involves estimating this current temperature $T_{act}$ by means of a temperature estimating unit 52 with the use of a mathematical model, and routing it to the closing force estimating unit 51 as an $T_{act\_est}$ value. To this end, the current operating current $I_{act}$ and the voltage signal $U_{PWM}$ generated by the driver circuit 41, which represents the engine voltage of the electric motor 31, are used as the operating parameters, as will be explained in detail further below based on FIG. 13. Otherwise, the structural design and function correspond to the exemplary embodiment according to FIGS. 6 and 4.

Figure 9:
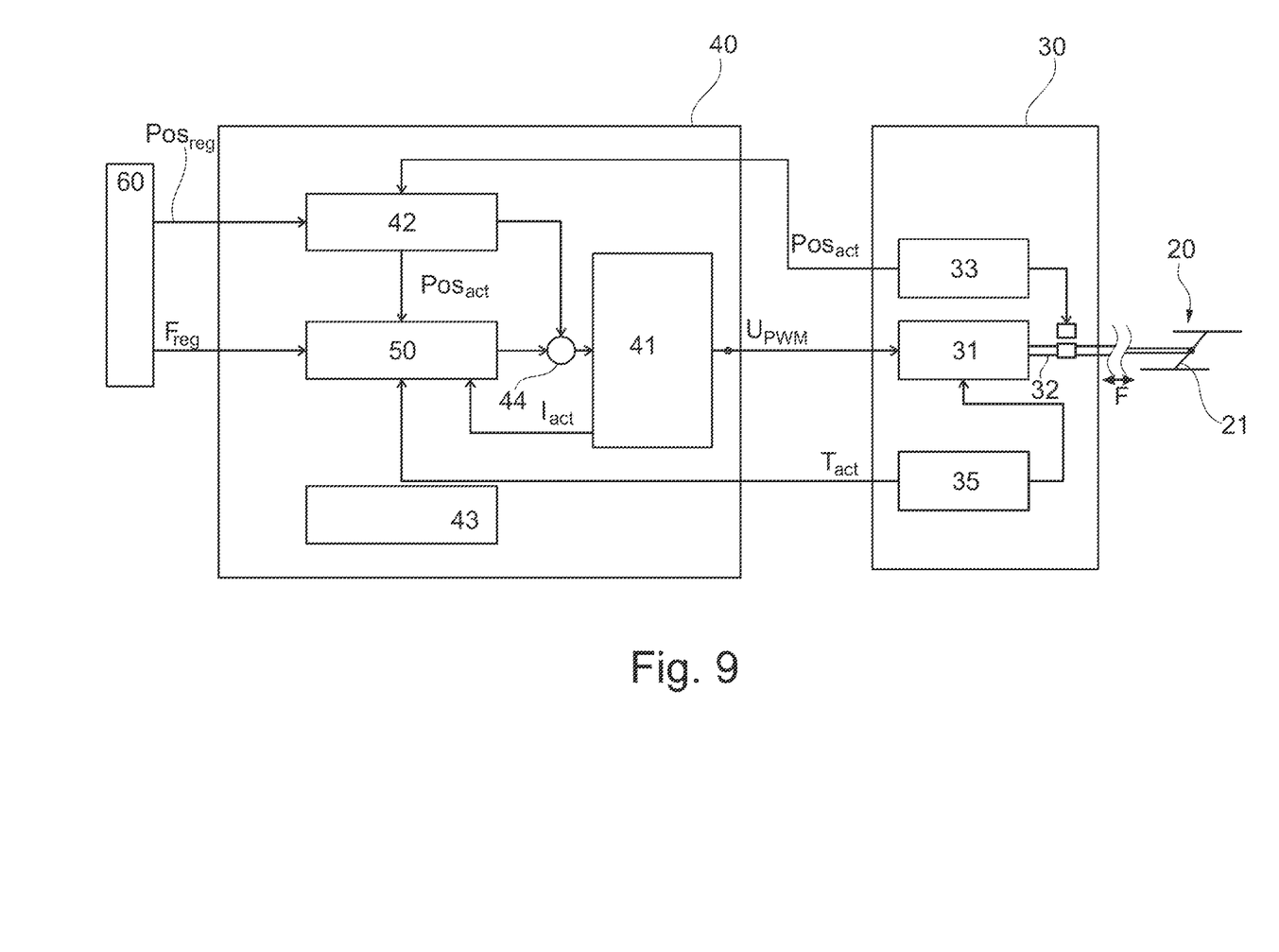
FIG. 9 is a block diagram of an actuator with trigger circuit according to an exemplary embodiment.

FIG. 9 shows an exemplary embodiment in which the structural design of the control unit 40 corresponds to the one on FIG. 2, but the actuator 30 has a temperature sensor 35 instead of a force sensor 34. In this exemplary embodiment according to FIG. 9 as well, the closing force F on the wastegate 21 is regulated to a desired value, but the closing force F itself is not used as a control variable, but rather the operating current I as an operating parameter of the electric motor 31, as will be explained based on FIG. 10.

Figure 10:
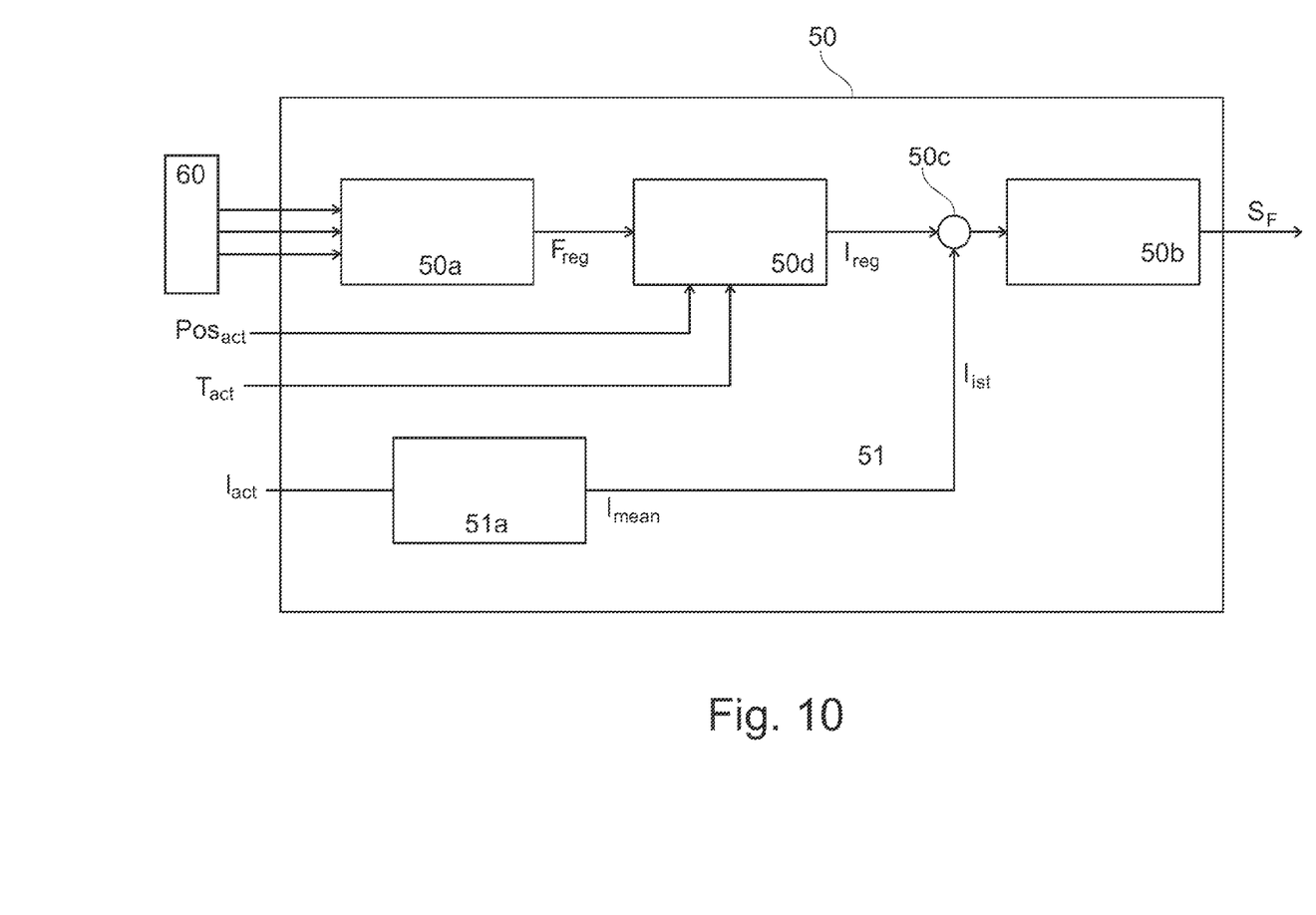
FIG. 10 is a block diagram of the closing force controller according to FIG. 9.

The closing force controller 50 connected to an engine controller 60 according to FIG. 10 encompasses a closing force calculating unit 50a, which determines a desired value for the closing force $F_{reg}$ based on operating parameters of the internal combustion engine 1, and relays this desired value to a desired current calculating unit 50d, which estimates a desired value for the operating current $I_{req}$ based on a mathematical model. This mathematical model makes use of the following formula:

$$I_{req} = (F_{req} \cdot K(Pos_{act}))/B(T_{act}),$$

wherein $F_{reg}$ is the desired value for the closing force, $K(Pos_{act})$ is a coupling factor as a function of the current wastegate position $Pos_{act}$ generated by the position sensor 33, and B(T) is a coupling factor as a function of the current operating temperature $T_{act}$ generated by the temperature sensor 35.

The closing force controller 50 further encompasses a current calculating unit 51a, which calculates a mean $I_{mean}$ as the actual value for the operating current $I_{ist}$ out of the operating current $I_{act}$ of the electric motor 31, wherein this current calculating unit 51a can also be part of the engine controller 60.

The desired value for the operating current $I_{reg}$ and actual value for the operating current $I_{ist}$ are routed to a summating unit 50c to form a control deviation, so as to then have a PID controller 50b generate a control signal $S_F$, which according to FIG. 9 is relayed via the summating unit 44 to the driver circuit 41, which uses it to form the PWM voltage signal $U_{PWM}$ as a control variable for the electric motor 31.

Figure 11:
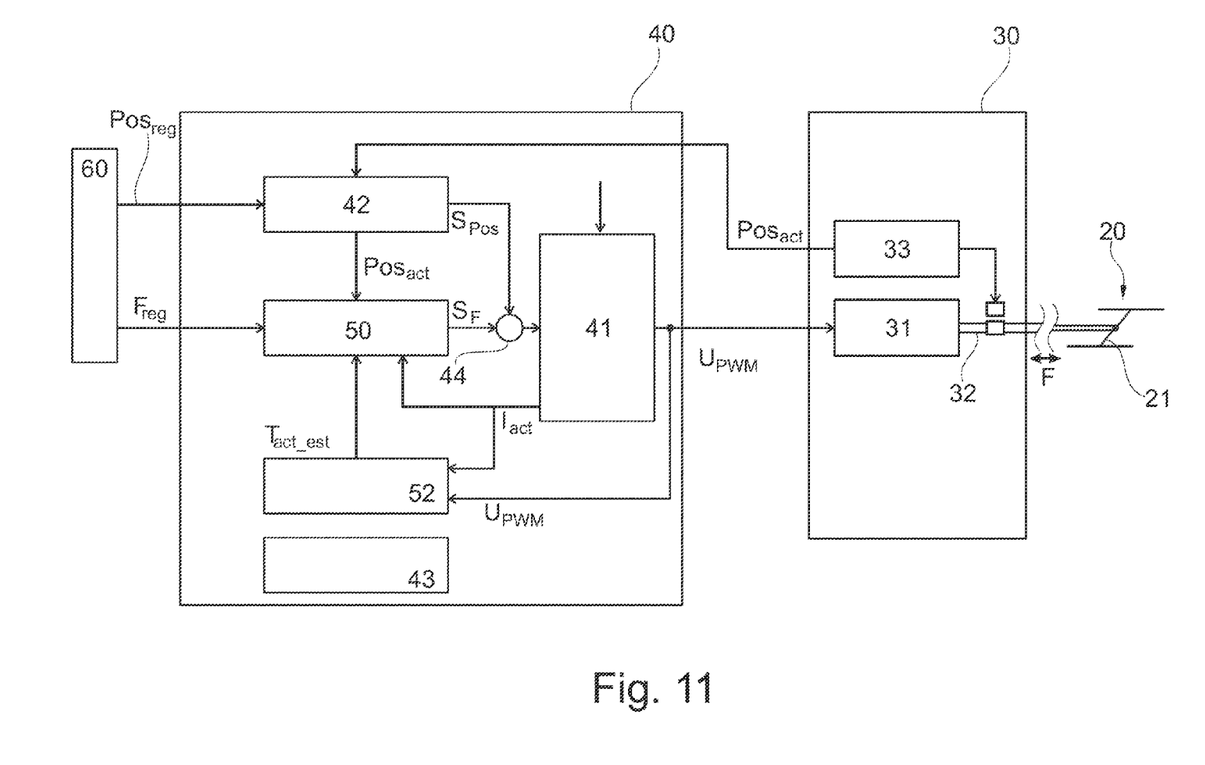
FIG. 11 is a block diagram of an actuator with trigger circuit according to another exemplary embodiment.
Figure 12:
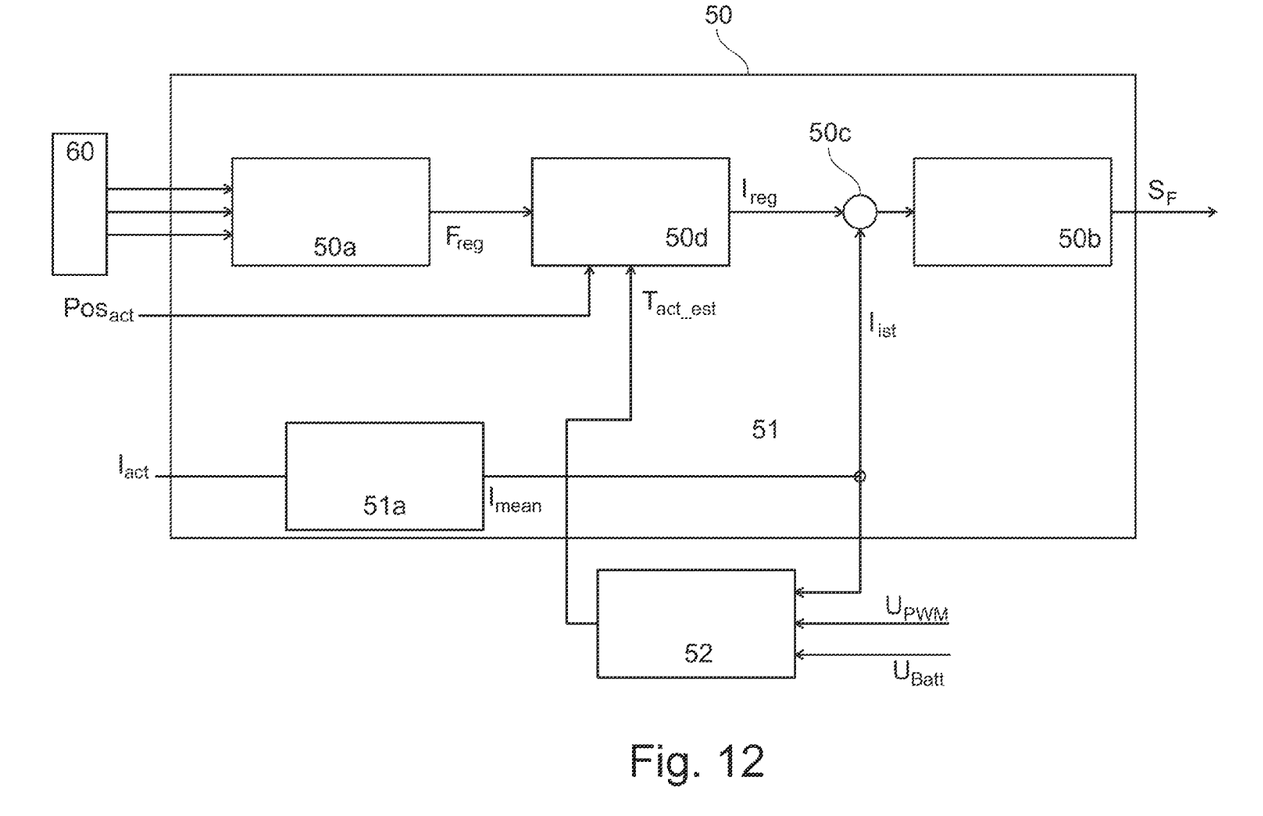
FIG. 12 is a block diagram of the closing force controller according to FIG. 11 with a temperature estimating unit according to an exemplary embodiment.

By comparison to the exemplary embodiment according to FIG. 9, the latter one according to FIG. 11 does without a temperature sensor 35, and instead estimates the current temperature $T_{act}$ by a temperature estimating unit 43 with the use of a mathematical model. To this end, the current operating current $I_{act}$ and the voltage signal $U_{PWM}$ generated by the driver circuit 41 are used as the operating parameters, as will be explained in detail further below based on FIG. 13. Otherwise, the structural design, in particular to include the structural design of the closing force controller 50 according to FIG. 12, and the function correspond to the exemplary embodiment according to FIGS. 9 and 7, except that the current temperature is not made available by a temperature sensor 35, but rather routed to the closing force controller 50 by the temperature estimating unit 52 as an estimated value $T_{act\_est}$. In order to calculate this $T_{act\_est}$ value, the temperature estimating unit 52 according to FIG. 12 has routed to it the actual value for the operating current $I_{ist}$ calculated by the current calculating unit 51a and the battery voltage $U_{Batt}$ of an onboard power supply as the current value, along with the voltage signal $U_{PWM}$ as the engine voltage of the electric motor 31.

As announced, the structural design and function of the temperature estimating unit 52 according to FIG. 13 will be explained below.

Figure 13:
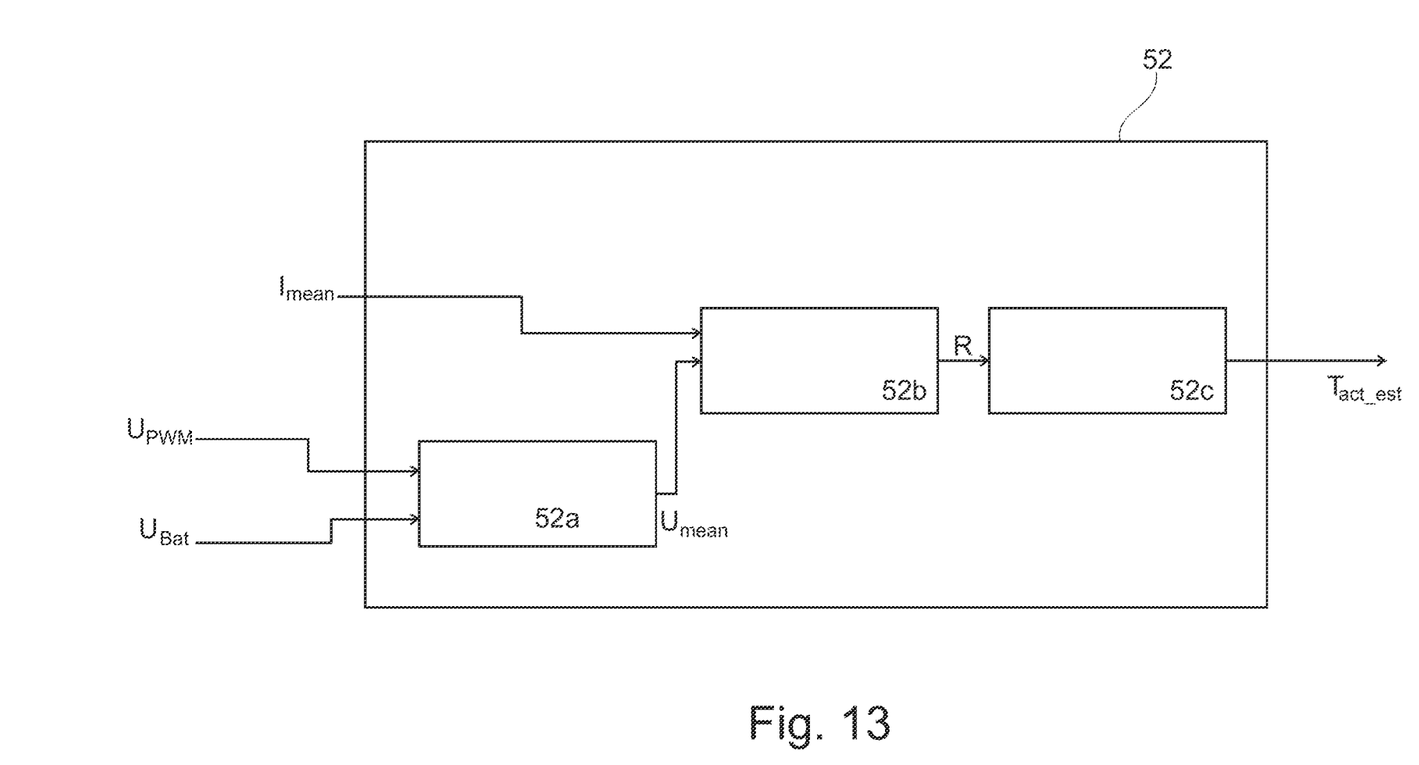
FIG. 13 is a block diagram of the temperature estimating unit according to FIG. 2

According to FIG. 13, this temperature estimating unit 52 encompasses a voltage calculating unit 52a, a resistance calculating unit 52b and a temperature calculating unit 52c. The engine voltage $U_{PWM}$ and battery voltage $U_{Batt}$ are routed to the voltage calculating unit 52a, and a mean voltage $U_{mean}$ is calculated from the latter, which along with the mean current $I_{mean}$ as the actual value for the operating current $I_{ist}$ is made available to the resistance calculating unit 52b, which calculates the electrical resistance R for the winding of the electric motor 31 based on the following formula:

$$R = U_{mean}/I_{mean}.$$

This value R for the calculated resistance is routed to the temperature calculating unit 52c, which determines the estimated temperature value $T_{act\_est}$ according to the function T=f(R) based on a temperature model.

In the exemplary embodiments according to FIGS. 2 to 9, the desired value to which the closing force F on the wastegate 21 is regulated is decreased to a lower value if the operating temperature $T_{act}$ of the electric motor 31 acquired by the temperature sensor 35 or the operating temperature $T_{act\_est}$ estimated by the temperature estimating unit 52 reaches an excessive temperature threshold value.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

The invention claimed is:

1. A method for controlling an electrical actuator for a wastegate valve arrangement of an exhaust gas turbocharger in an internal combustion engine, wherein a wastegate valve is situated in a bypass channel of the exhaust gas turbocharger, the method comprising the steps of:

controlling the wastegate valve closed by the electrical actuator such that the exhaust gas flow routed past the exhaust gas turbocharger via the bypass channel is adjusted;

estimating an actual value for a closing force based on an operating current and an operating temperature of the electric actuator;

estimating a desired value for a closing force based on the actual value; and controlling the wastegate valve to move to one of closed and open based on the desired value.

2. The method according to claim 1, wherein a control deviation is determined from the desired value for the closing force and the actual value for the closing force, and relayed to a controller for generating the control signals for regulating the electrical actuator.

3. A system for controlling exhaust gas in an internal combustion engine including an exhaust gas turbocharger and a wastegate valve arrangement, the system comprising:
   the internal combustion engine generating the exhaust gas;
   a wastegate valve situated in a bypass channel of the exhaust gas turbocharger;
   an electrical actuator that closes or opens the wastegate valve to adjust the exhaust gas routed past the exhaust gas turbocharger via the bypass channel; and
   a controller that controls the wastegate valve by the electrical actuator;
   the controller performing the following functions:
   estimates an actual value for a closing force based on an operating current and an operating temperature of the electric actuator;
   estimates a desired value for a closing force based on the actual value; and
   controls the exhaust gas by moving the wastegate valve to one of closed and open based on the desired value.

4. The system according to claim 3, wherein the controller calculates the actual value for the closing force from a position of the wastegate valve determined by a position sensor.

5. The system according to claim 4, wherein the controller calculates a desired value for the operating current from a desired value for the closing force, the temperature of the electrical actuator, and the position of the wastegate valve determined by the position sensor.

6. The system according to claim 4, wherein the controller calculates the operating temperature from the operating current of the electrical actuator and a voltage supplied to the electrical actuator.

7. A system for controlling a wastegate valve arrangement in an internal combustion engine, the system comprising:
   a wastegate valve situated in a bypass channel of an exhaust gas turbocharger;
   an electric actuator for moving the wastegate valve;
   a computer program product, comprising:
   a non-transitory computer-readable medium embodying a computer program for performing a method of controlling the electrical actuator for the wastegate valve arrangement of the exhaust gas turbocharger in the internal combustion engine, the method comprising the steps of:
      controlling the wastegate valve closed by the electrical actuator such that the exhaust gas flow is routed past the exhaust gas turbocharger via the bypass channel is adjusted;
      estimating an actual value for a closing force based on an operating current and an operating temperature of the electric actuator;
      estimating a desired value for a closing force based on the actual value; and
      controlling the wastegate valve to move to one of closed and open based on the desired value.

8. The system according to claim 7, wherein the actual value for the closing force is estimated further based on a position of the wastegate valve determined with a position sensor.

9. The system according to claim 8, wherein a desired value for the operating current is determined based on the position of the wastegate valve determined by the position sensor and the operating temperature of the electrical actuator, and a control deviation is ascertained through comparison with an actual value for the operating current, and relayed to a controller for generating the control signals for regulating the electrical actuator.

10. The system according to claim 7, wherein the operating temperature of the electrical actuator is estimated from a voltage supplied to the electrical actuator and the operating current based on a calculation model.

11. The system according to claim 7, wherein the desired value for the closing force is determined as a function of operating parameters of the internal combustion engine.

12. The system according to claim 7, wherein a control deviation is determined from the desired value for the closing force and the actual value for the closing force, and relayed to a controller for generating the control signals for regulating the electrical actuator.

* * * * *